3,130,219
PRODUCTION OF ALKYL VINYL ETHERS
Horst Pommer, Ludwigshafen (Rhine), and Georg Wittig, Heidelberg, Germany, assignors to Badische Anilin- & Soda-Fabrik Aktiengesellschaft, Ludwigshafen (Rhine), Germany
No Drawing. Filed May 11, 1960, Ser. No. 28,199
Claims priority, application Germany Aug. 13, 1955
1 Claim. (Cl. 260—473)

This invention relates to a process for producing alkyl vinyl ethers and aldehydes from phosphonium ylides and formic acid esters.

We have found that alkyl vinyl ethers and aldehydes can be obtained by allowing formic acid esters to react with phosphonium ylides and, if the aldehyde is desired as the reaction product, hydrolyzing the alkyl vinyl ether which occurs as the reaction product before hydrolyzation.

The course of the reaction is as illustrated below, by way of example, with benzyl-triphenyl-phosphonium ylide being used as the phosphonium ylide and methyl formate being used as the formic acid ester:

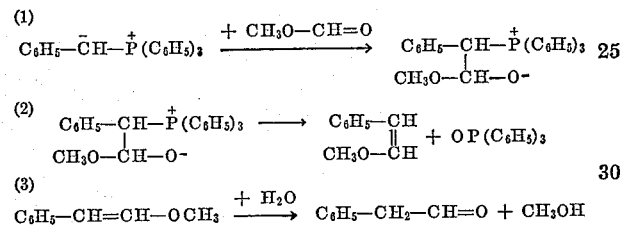

By alkyl vinyl ethers we understand vinyl compounds which contain a lower alkoxy group attached to one carbon atom of the vinyl group and having at least one hydrogen atom attached to the other carbon atom of the vinyl group.

The phosphonium ylides may be obtained by reacting organic halogen compounds with tertiary phosphines, in particular triphenyl phosphine, to form quaternary phosphonium salts which by treatment with agents which combine with hydrogen halide are converted into the corresponding phosphonium ylides. When using benzyl chloride as an organic halogen compound, triphenyl phosphine, as a tertiary phosphine, and sodium acetylide as an agent which combines with hydrogen halide, the preparation of the phosphonium ylide may be represented by the following scheme:

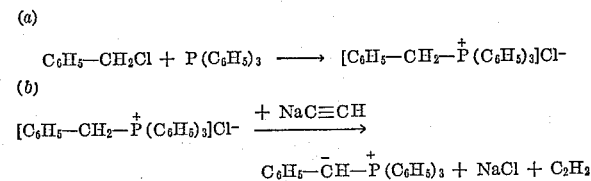

As organic halogen compounds there may be used a great variety of aliphatic, cycloaliphatic or araliphatic halogen compounds which still have at least one hydrogen atom on the carbon atoms bearing the halogen atom; the halogen compounds can be saturated or may have one or more isolated or conjugated double and/or triple linkages and may also bear substituents which do not impair the ylide formation according to the above-named Equation b. Among the suitable halogen compounds area, for example, straight chain and branched primary and secondary alkyl halides, such as methyl, propyl, isopropyl, hexyl, dodecyl chloride, cyclohexyl chloride, benzyl and diphenyl methyl chloride and the corresponding bromides and iodides, methoxy-, chlor- or carbethoxy-benzyl bromide, allyl bromide, beta-cyclogeranyl bromide, ionyl bromide, ethoxyethyl bromide, chloracetic acid esters, chlor-acetonitrile, 1,4-dichlorethane or propylene bromide; the latter can be reacted with one or with two mols of triphenyl phosphine. Instead of triphenyl phosphine other tertiary phosphines, especially triaryl phosphines, may be used such as tri-p-tolyl phosphine, trichlorophenyl phosphine, diphenyl-p-tolyl phosphine or naphthyl diphenylphosphines. The reaction to the quaternary phosphonium salts according to (a) is carried out in the usual manner, for example by dissolving the components in ether, benzene, tetrahydrofurane or dimethylformamide and heating, if necessary in a closed vessel.

As agents for combining with halogen hydride for the formation of the phosphonium ylides according to (b) there may be used organometallic compounds, such as methyl, butyl or phenyl lithium, methyl or phenyl magnesium bromide, calcium or sodium acetylide and also sodium or potassium amides and alkali or alkaline earth metal alcoholates.

More generally speaking the compounds capable of binding hydrogen halide are lower alkyl lithium compounds, lower alkyl and aryl magnesium halides, alkali and alkaline earth metal acetylides, alcoholates and amides.

In a preferred embodiment of our invention the organic halogen compound, the tertiary phosphine, and the compound capable of binding hydrogen halide are reacted with each other in the manner illustrated by the Equations a and b in about equivalent amounts.

The preferred method of carrying out the process according to this invention, i.e. the production of alkyl vinyl ethers or aldehydes from phosphonium ylides according to Equations 1, 2, and 3, is by causing these, without isolating them from their solutions or suspensions in which they are prepared by the reaction of organic halogen compounds with tertiary phosphines and agents combining with hydrogen halide, to react with formic acid esters, e.g. formic acid lower alkyl esters, such as methyl, ethyl, benzyl or phenyl formate, by introducing the formate into the reaction mixture obtained according to Equation b. There is thereby apparently formed first an addition product according to (1) which then decomposes according to (2), especially upon heating up to about 90° C. with the formation of the corresponding tertiary phosphine oxide and a vinyl ether, i.e., the ether of the enolic form of the desired aldehyde. The latter if it does not hydrolyze during the reaction can be hydrolyzed in a known manner to the corresponding aldehyde, for example by heating with a dilute acid, such as sulfuric, hydrochloric or phosphoric acids or toluene sulfonic acid.

As dissolving or suspension agents those may be used which are inert to the reactants under the reaction conditions.

The aldehyde formed in the reaction mixture can be stripped by distilling off the aldehyde.

The new synthetic process is capable of the widest application. It permits the synthesis of many aldehydes, which were hitherto not accessible or only accessible by much more troublesome methods, from readily accessible initial materials; for example the process may be used for the production of beta-gamma unsaturated aldehydes from alpha,beta-unsaturated halogen compounds. Such beta,gamma-unsaturated aldehydes are important intermediate products for many syntheses, especially in the vitamin A series. With respect to the organic halogen compounds from which the phosphonium ylides serving as initial materials in the process according to this invention are prepared, the aldehydes obtained as final products are those in which the halogen of said halogen compounds has been replaced by the group —CH=O. Accordingly the aldehydes may be called the homologues of the halogen compounds.

The following examples will further illustrate this invention but the invention is not restricted to these examples. The parts specified are parts by weight.

Example 1

217 parts of beta-cyclogeranyl bromide are reacted in the usual way with 268 parts of triphenyl phosphine to form the quaternary phosphonium salt. Of the beta-cyclogeranyl triphenyl phosphonium bromide obtained, 90 parts are dissolved in 200 parts of dimethylformamide and 10 parts of finely powdered sodium acetylide are added thereto under a nitrogen atmosphere. After stirring for 1 hour at 20° C. there are added to the resultant deep red solution of triphenyl-phosphonium-beta-cyclogeranylide, 30 parts of ethyl formate and the whole heated for 5 hours at 60° C. After cooling, 50 parts of 10% sulfuric acid are added, all volatile reaction products are distilled off with steam and the distillate is extracted with methylene chloride. After evaporating the extraction agent, the residue is fractionally distilled, whereby after a first runnings boiling at from about 67° to 80° C. at 14 mm. Hg pressure, 19 parts of 2',6',6'-trimethylcyclohexene-(1')-yl-(1')-acetaldehyde of the boiling point 108° to 112° C. at 14 mm. Hg pass over. The phenyl semicarbazone of the aldehyde prepared in the usual way melts at 157° C.

Example 2

127 parts of benzyl chloride are reacted in the usual way with 268 parts of triphenylphosphine to form the quarternary phosphonium salt. 90 parts of the resultant benzyl triphenyl phosphonium chloride are dissolved in 200 parts of dimethylformamide and then converted into the triphenyl phosphonium benzylide under a nitrogen atmosphere with 10 parts of sodium acetylide. 30 parts of ethyl formate are added to the resultant red solution. By working up as in Example 1, 18 parts of phenyl acetaldehyde of the boiling point 88° C. at 15 mm. Hg are obtained.

Example 3

A solution of n-butyl-lithium in absolute ether which contains 7 parts of lithium is allowed to flow slowly, with cooling, into a suspension of 350 parts of methyl triphenyl phosphonium bromide, obtained from triphenylphosphine and methyl bromide, in 1,200 parts of absolute ether. With the salt passing gradually in solution, the deep yellow triphenyl phosphonium methylide separates in part in a crystalline form, while the bulk thereof remains dissolved. Then 105 parts of n-butyl formate are added continuously, the vigor of the reaction being moderated by cooling at intervals. After stirring the mixture for 12 hours at room temperature, it is heated and kept boiling for 3 hours, then cooled, filtered from the triphenyl phosphine oxide precipitated and the filtrate is distilled in a column, 62 parts of vinylbutyl ether passing over. The latter can be hydrolyzed with acids to form acetaldehyde in conventional manner.

Example 4

By the manner described in the preceding example 385 parts of n-propyltriphenylphosphonium bromide, prepared from triphenylphosphine and n-propyl bromide, are caused to react with an ethereal solution of n-butyllithium to form propenylidenetriphenyl phosphine and further with 80 parts of ethyl formate. After stirring for 12 hours the mixture is filtered by suction and the filtrate is stripped of solvent by distillation in a small column. To the bottoms 10 parts of oxalic acid are added and the mixture is distilled with steam. The distillate is fractionally distilled in a column, the fractions passing over up to 95° C. being collected. The n-butyraldehyde contained in the distillate is isolated in the form of its bisulfite compound and disengaged therefrom by treatment with sodium carbonate (cf. Lipp, Liebigs Annalen Chem., vol. 205 (1880), page 2), 52 parts of n-butyraldehyde having a boiling point of 75° C. to 76° C. at a pressure of 760 mm. Hg being obtained.

Example 5

385 parts of isopropyltriphenyl phosphonium bromide, prepared from triphenylphosphine and isopropyl bromide, are converted into isopropylidene triphenyl phosphine by reaction with an ethereal solution of n-butyllithium and further reacted with 80 parts of ethyl formate in the manner described in Example 4. By further processing the reaction mixture as described in the foregoing examples 48 parts of isobutyraldehyde having a boiling point of 62° to 64° C. at a pressure of 760 mm. Hg are obtained.

Example 6

A solution of phenyl lithium in absolute ether which contains 1.4 parts of lithium is allowed to run by small portions, at room temperature, into a solution of 95 parts of dodecyltriphenyl phosphonium chloride, prepared from dodecyl chloride and triphenyl phosphine, in 250 parts of absolute tetrahydrofurane, the deep yellow dodecylidene triphenyl phosphine being almost instantaneously formed. 20 parts of ethyl formate are added to the clear yellow solution by small portions and then the solution is stirred for 24 hours at room temperature. After distilling off the solvent, the bottoms are extracted with petroleum ether with the triphenyl phosphine oxide remaining substantially undissolved. The petroleum ether extract is shaken for 18 hours with a 20% aqueous solution of phosphoric acid. The petroleum ether layer is then separated, washed several times with water, dried with sodium sulfate and the bottoms left after the evaporation of the petroleum ether are distilled in vacuo. The tridecene aldehyde so obtained distills over at 147° to 150° C. under a pressure of 18 mm. Hg. The distillate solidifies on cooling to form a crystalline mass which melts at 13° to 14° C.

Example 7

An ethereal solution of n-butyl lithium which contains 7 parts of lithium is allowed to run slowly into a suspension of 425 parts of cyclohexyl triphenyl phosphonium bromide, prepared from cyclohexyl bromide and triphenylphosphine, in 1,200 parts of absolute ether. When the formation of cyclohexylidene triphenyl phosphine is complete after 6 hours' stirring 80 parts of ethyl formate are added continuously. The mixture is then further stirred for 24 hours at room temperature, heated under reflux for 3 hours, cooled and stripped from the triphenylphosphine oxide precipitated by filtration. The filtrate is stripped of solvent and distilled with steam after adding 10 parts of oxalic acid. The steam distillate is extracted with ether and the ether extract is distilled after adding 0.1 part of hydroquinone, 61 parts of hexahydrobenzaldehyde with a boiling point of 72° to 74° C. at a pressure of 18 mm. Hg being obtained.

Example 8

An ethereal solution of methyl lithium which contains 2.8 parts of lithium is added to a suspension of 150 parts of 1,4-butane-bis-triphenylphosphonium bromide, prepared from 1 mol of 1,4-dibromobutane and 2 mols of triphenylphosphine, in 500 parts of absolute tetrahydrofurane. After 4 hours' stirring the salt has passed into solution and the formation of the deep yellow 1,4-butadiene-(1,3)-bis-triphenylphosphine is complete. After adding 16 parts of ethyl formate the mixture is stirred for 48 hours at room temperature, the solvent is distilled off, 12 parts of oxalic acid are added and the mixture is then distilled with steam. From the pungent smelling distillate adipic dialdehyde is obtained with a good yield.

Example 9

A concentrated alcoholic solution of sodium ethylate prepared from 23 parts of sodium is added to a solution of 340 parts of cyanomethyltriphenyl phosphonium chloride, prepared from cyanomethyl chloride and triphenylphosphine, in 1,000 parts of absolute alcohol. The formation of cyanomethylene-triphenyl-phosphine, partly in the form of a thick precipitate, occurs almost instantaneously. Then, after adding 80 parts of ethyl formate, the mixture is stirred for 48 hours at room temperature, the alcohol is substantially distilled in vacuo and the bottoms are shaken with a concentrated aqueous solution of oxalic acid for 6 hours. The mixture so obtained is then extracted with ether and the ethereal extract is fractionally distilled in a small column, 31 parts of formyl-acetonitrile with a boiling point of 71° to 73° C. at a pressure of 760 mm. Hg. being obtained.

*Example 10*

90 parts of a 30% methanolic solution of sodium methylate are added to a solution of 260 parts of beta-ionyltriphenylphosphonium bromide, prepared from beta-ionyl bromide and triphenylphosphine, in 500 parts of dimethyl formamide. The formation of the red-violet beta-ionylidenetriphenylphosphine occurs with slight heat evolution. After stirring for 3 hours at room temperature 40 parts of ethyl formate are added. The mixture is then further stirred for 24 hours and exhaustively extracted with petroleum ether. The extract is washed with water and, after adding 10 parts of oxalic acid, distilled with steam. The distillate is shaken with petroleum ether and the pale yellow petroleum ether solution is washed with water, dried with anhydrous sodium sulfate and distilled. The distillation product passing over at a pressure of 0.05 mm. Hg. and a temperature of 75° to 90° C. is a mixture of isomers of the so-called beta-$C_{14}$-aldehydes. For separating the isomers the mixture is dissolved in a little petroleum ether and chromatographed with aluminum oxide (Brockmann standard). As a result, 22 parts of beta-$C_{14}$-aldehyde (4 - [2',6',6' - trimethylcyclohexene - (1') - yl - (1')-]-2-methylbutene-(2)-al-(1)) are eluated with petroleum ether. This aldehyde has the boiling point 76° to 77° C. at a pressure of 0.05 mm. Hg., and its phenyl semicarbazone has a melting point of 184° C. With a petroleum ether/benzene mixture (ratio 2:1) 34 parts of iso-beta-$C_{14}$-aldehyde (4 - [2',6',6' - trimethylcyclohexylidene-(1')-]-2-methylbutene-(2)-al-(1)) are eluated. This isomeric aldehyde has the boiling point 86° to 88° C. at a pressure of 0.01 mm. Hg. and shows an absorption maximum at 296 m$\mu$ ($\epsilon$=27,000); its phenyl semicarbazone melts at 156° C.

*Example 11*

In the manner described in the foregoing example 260 parts of beta-ionyltriphenylphosphonium bromide are reacted first with 90 parts of a 30% methanolic solution of sodium methylate and then with 40 parts of ethyl formate. After extracting the reaction product exhaustively with petroleum ether, it is distilled directly, 61 parts of 4-[2',6',6' - trimethylcyclohexene - (1') - yl - (1')-]-1-ethoxy-2-methylbutadiene-(1,3) being obtained. This vinyl ether has the boiling point 71° to 73° C. at a pressure of 0.05 mm. Hg. and shows an absorption maximum at 258 m$\mu$ ($\epsilon$=14,500). By saponifying the vinyl ether with aqueous acid in conventional manner the free beta-$C_{14}$-aldehyde mixture described in Example 10 is obtained.

*Example 12*

A suspension of 206 parts of 4-chlorobenzyltriphenylphosphonium chloride, prepared from 4-chlorobenzyl chloride and triphenyl phosphine, in 1,000 parts of absolute benzene is shaken with 200 parts of an about 30% suspension of sodium amide in absolute benzene for 48 hours, the orange-red 4-chlorobenzylidene-triphenylphosphine being formed with the liberation of gaseous ammonia. The excess sodium amide and the sodium chloride precipitated are filtered off while excluding moisture. The orange-red benzene solution obtained is combined with 40 parts of ethyl formate and stirred for 48 hours at room temperature. After distilling off the solvent 300 parts of a 10% aqueous solution of phosphoric acid are added and the mixture is then stirred for 10 hours at room temperature. It is then extracted with petroleum ether, the resulting extract is washed with water, dried with anhydrous sodium sulfate at —5° C. and distilled, 34 parts of 4-chlorophenyl acetaldehyde passing over at a boiling point of 114° to 116° C. at a pressure of 13 mm. Hg.

*Example 13*

12 parts of a solution of ethyl-magnesium bromide in tetrahydrofurane which contains 12 parts of magnesium, are added to a suspension of 205 parts of 4-methoxybenzyltriphenylphosphonium chloride prepared from 4-methoxybenzyl chloride and triphenylphosphine, in 1,000 parts of absolute tetrahydrofurane. After stirring for 5 hours the formation of the orange-red 4-methoxybenzylidene triphenylphosphine is complete. After adding 40 parts of ethyl formate, the reaction mixture is stirred for 24 hours at room temperature and further processed as in Example 12, 36 parts of 4-methoxyphenyl acetaldehyde with a boiling point of 142° to 143° C. at a pressure of 13 mm. Hg. being obtained. The semicarbazone thereof melts at 180° to 181° C.

This application is a continuation-in-part of our copending application Serial No. 600,403 now abandoned.

We claim:

A process for producing a vinyl ether having a lower alkoxy group attached to one carbon atom of the vinyl group of said ether and having at least one hydrogen attached to the other carbon atom of said vinyl group which comprises: adding a lower alkyl formic acid ester to an inert organic liquid consisting essentially of a triaryl phosphonium ylide of an organic halogen compound selected from the group consisting of methyl chloride, propyl chloride, isopropyl chloride, hexyl chloride, dodecyl chloride, cyclohexyl chloride, benzyl chloride and diphenyl methyl chloride, and the corresponding bromides and iodides, methoxy-benzyl bromide, chlor-benzyl bromide, carbethoxy-benzyl bromide, allyl bromide, beta-cyclogeranyl bromide, ionyl bromide, and ethoxyethyl bromide, and heating said reaction mixture to a temperature up to about 90° C. to form said vinyl ether.

References Cited in the file of this patent
FOREIGN PATENTS
790,823 Great Britain _____ Feb. 19, 1958
OTHER REFERENCES
Levine: Jour. Amer. Chem. Soc., vol. 80 (1958), p. 6150.